UNITED STATES PATENT OFFICE.

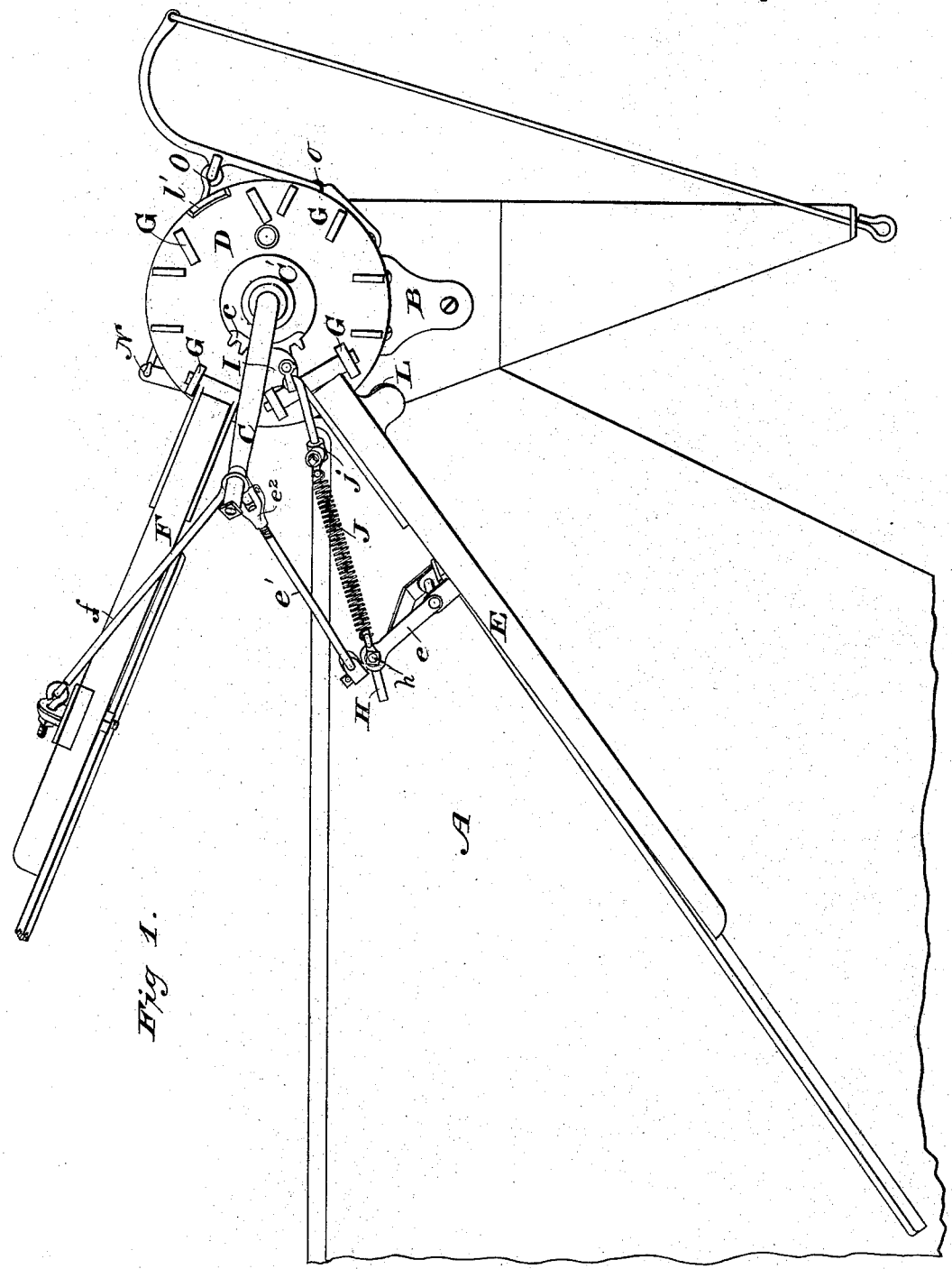

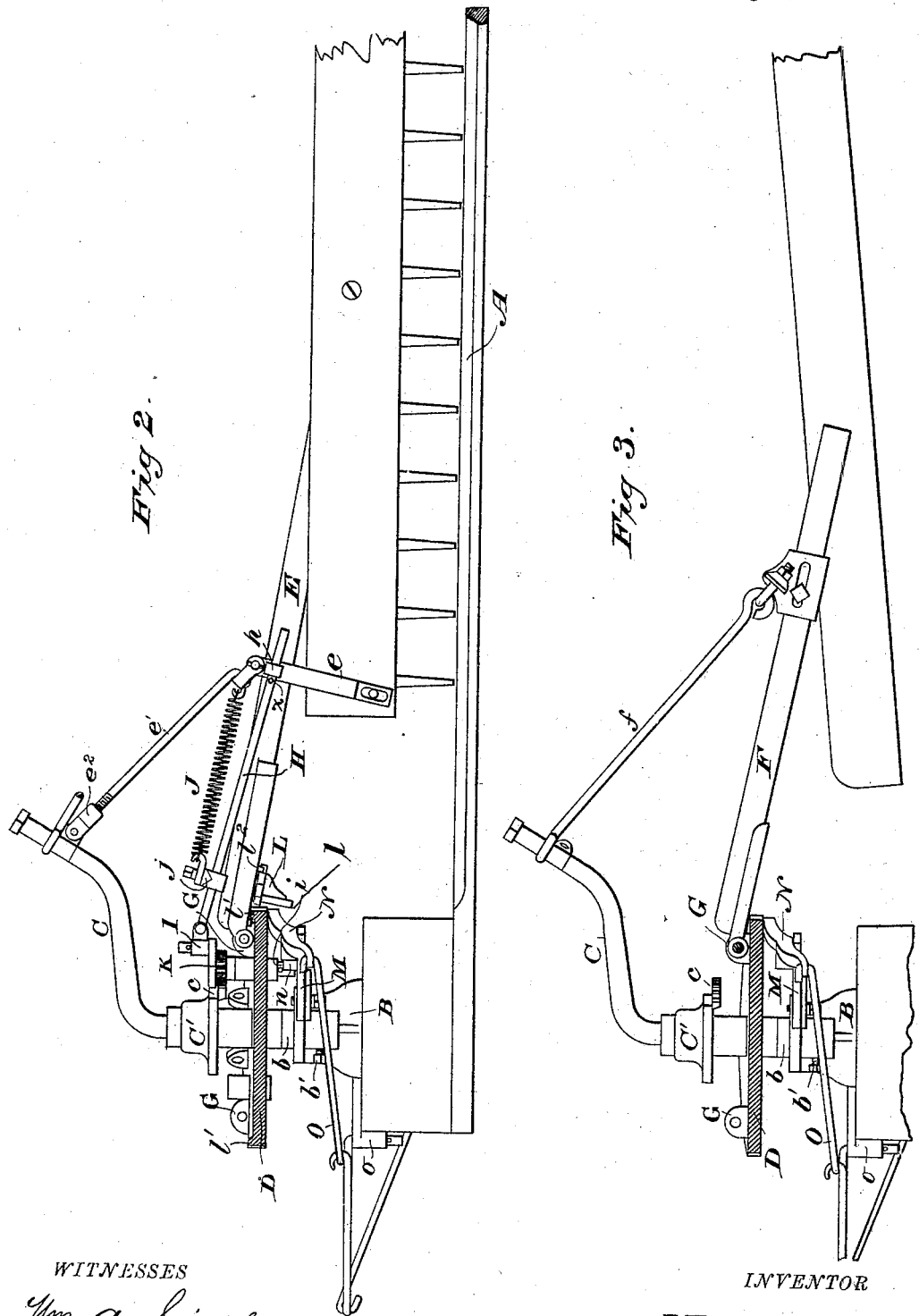

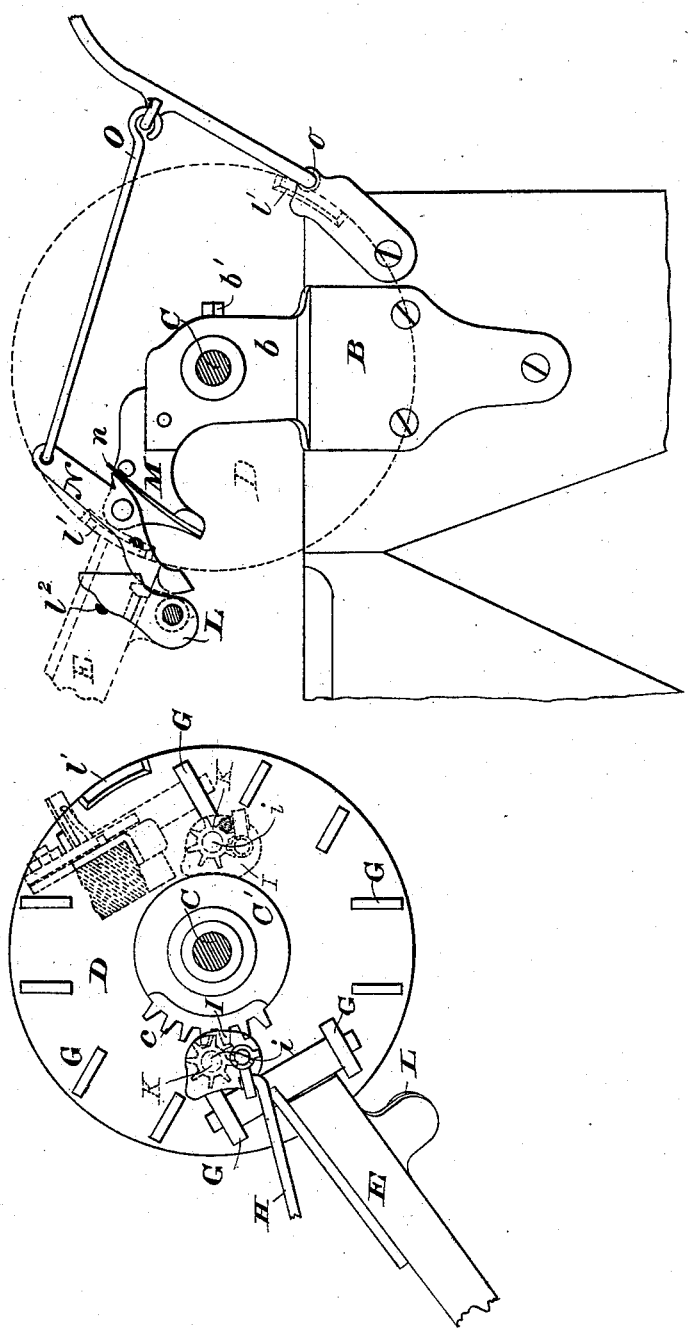

J. HERVA JONES, OF ROCKFORD, ILLINOIS, ASSIGNOR TO RALPH EMERSON AND WILLIAM A. TALCOTT, OF SAME PLACE.

HARVESTER-RAKE.

SPECIFICATION forming part of Letters Patent No. 257,224, dated May 2, 1882.

Application filed July 28, 1879.

*To all whom it may concern:*

Be it known that I, J. HERVA JONES, of Rockford, in the county of Winnebago and State of Illinois, have invented certain new and useful Improvements in Harvester-Rakes, of which the following is a specification.

My invention relates to improvements in that class of rakes in which rising and falling rake and reel arms jointed at their heel ends to revolving supports are employed, resembling in some respects improvements represented in sundry Letters Patent of the United States granted for inventions made by John Barnes. Among the said Barnes's inventions may be mentioned that patented December 15, 1874, No. 157,672.

The object of the first part of my invention is, by simple and inexpensive means, to give the proper movements about two centers of motion to a combined rake and reel, or rake-head adapted for action as such, or simply as a reel bat or beater, and to facilitate the change from a rake to a beater, or vice versa; and under this head my improvements may be defined as consisting in the combination of a revolving rake and reel support—such as a crown-wheel—a bent or crooked rake-post projecting inwardly and upwardly or extending in a general direction toward the cutting apparatus and platform side of the machine, a rake-head carried by an arm hinged to the crown-wheel near its edge or remote from its center and playing vertically about its hinge, a flexible elongating and shortening connection between the rake-arm or its head, and the top or overhanging end of the rake-post, which connection accommodates variations in the distance between the points of its attachment with the rake head or arm and with the rake-post, resulting from differences in the altitude of the rake-head, according to whether acting as a rake or not so acting when moving over the platform, and a dog for interposition between the crown-wheel and rake-arm, whereby when the dog is in its operative position the rake-head is elevated above the grain on the platform and its connection with the rake-post shortens, and when the dog is in its inoperative position said connection lenghtens and the rake-head descends and is caused to revolve about or with the crown-wheel, so as to sweep off the grain, as will hereinafter fully appear.

My improvements also relate to the combination, with the above-defined elements, of tripping mechanism for controlling the operation of the rake-head.

My improvements also consist in the combination of the revolving rake and reel support or crown-wheel, the bent or crooked rake-post, the rake-head carried by the arm hinged to the crown-wheel and playing vertically about its hinge, a jointed pitman or link, and a swinging bracket, constituting a peculiar flexible elongating and shortening connection between the rake arm or its head and the top or overhanging end of the rake-post, the said connection accommodating variations in the distance between the points of its attachment with the rake head or arm and with the rake-post, resulting from differences in the altitude of the rake-head, according to whether acting as a rake or not so acting when moving over the platform, and the dog for interposition between the crown-wheel and rake-arm, whereby when the dog is in its operative position the rake-head is elevated above the grain on the platform and the connection with the rake-post shortens, and when the dog is in its inoperative position said connection lengthens and the rake-head descends and is caused to revolve about or with the crown-wheel, so as to sweep off the grain, as will hereinafter fully appear.

My improvements also relate to the combination, with the above-defined elements, of tripping mechanism for controlling the action of the dog by the position of which the operation of the rake-head is governed.

The object of the next part of my invention is to hold the rake down, in sweeping over the platform, by spring-pressure with force sufficient to insure proper work ordinarily, instead of depending upon gravity alone, and yet allow the rake to yield or rise to avoid breakage; and under this head my improvements may be defined as consisting in the combination of the crown-wheel or revolving rake-carrier, the bent or overhanging rake-post, a rising and falling rake-arm hinged to the crown-wheel, a lengthening and shortening flexible or link connection between the rake-post top and the rake-arm or its head, variable in length to accommodate differences in the distance between the rake-head and the top of the rake-post, and a spring assisting in holding the rake-head down to its work, while not preventing its rise or interfering with the shortening of the flexible connection when too great an obstacle to the continued movement of the rake in a horizontal plane is encountered, whereby while jumping or partial skipping of the gavels is prevented when the gavels are not too large or heavy, the rake will free itself from too great loads, such as sometimes accumulate with very thick or wet grain.

The object of the next part of my invention is to adapt the spring, which serves to hold the rake down to its work under ordinary circumstances while guarding against injury thereto, to a combined rake and reel, or rake-head convertible at the will of the operator from a rake to a beater, and vice versa; and under this head my improvements may be defined as consisting in the combination of the crown-wheel, the bent or overhanging rake-post, a rising and falling rake-arm hinged to the crown-wheel, a lengthening and shortening connection between the rake-post top and the rake-arm or its head, variable in length to accommodate differences in the distance between the rake-head and top of the rake-post, a spring assisting in holding the rake-head down to its work, while not preventing its rise when too great an obstacle to the continued movement of the rake-head in a horizontal plane is encountered, and mechanism under the control of the driver while in his seat upon the machine by which to prevent the descent of the rake-head to the platform when the reel-bat action of the head only is desired.

My improvements also consist in the combination of a revolving rising and falling combined rake and reel arm, its head, the bent or overhanging rake-post, a flexible lengthening and shortening connection (as a jointed pitman or link) between the rake-head and upper part of the rake-post, and a spring acting constantly with a tendency to elongate or hold extended to its full length the said flexible connection, and thus maintaining the proper relative positions of the rake-head and rake-post at all times or throughout the revolution of said head.

My improvements also relate to the combination, with the above-defined elements, of the dog, by which the rake-head is converted from a reel-bat or beater into a rake, and vice versa; and, further, under this head my improvements relate to a combination including tripping mechanism for controlling the action of the dog.

The object of the next part of my invention is to properly support the combined rake and reel in its passage over the platform, whether raking or not, and to govern its action during such time by adjusting the rake-arm relatively to the crown-wheel, by which its weight is supported, directly or indirectly, according to whether acting as a rake or as a reel; and under this head my improvements may be defined as consisting in the combination, with the before-recited crown-wheel, bent rake-post, hinged rake-arm, rake-head, and flexible elongating and contracting connection between the rake head or arm and rake-post top, of a dog adapted to be interposed between the rake-arm and crown-wheel and when so adjusted to rest upon the crown-wheel and support the rake-arm with the teeth of the rake above the platform, the rake at other times during its traverse of the platform being supported directly by the crown-wheel by the withdrawal of the dog.

The object of the next part of my invention is by simple and inexpensive automatic means or self-adjusting devices to give to the rake the proper movement about its two centers of motion to cause it to remove the cut grain from the platform in sweeping across or over and upon it horizontally and in the arc of a circle, and then to rise and pass round clear of the machine proper and the driver in his seat thereon to the point at which the rake again descends to repeat the raking operation; and under this head my improvements may be defined as consisting in the combination of a revolving rake-support—such as a crown-wheel—a bent or crooked rake-post projecting inward and upward or extending in a general direction toward the cutting apparatus and platform side of the machine, a rake-carrying arm hinged to the crown-wheel near its edge or remote from its center of revolution and playing vertically about its hinge, and a self-compensating or automatically-adjusting connection between the rake-arm and said bent post above the crown-wheel and eccentrically thereto, which connection elongates and shortens and is flexible or transversely yielding to accommodate variations in the distance between the points of attachment of said connection with the rake arm and with the rake-post resulting from the variations in the altitude or vertical positions of the rake, which, while at work to remove the cut grain, revolves about and is supported by the crown-wheel, and at other times revolves about both centers—the crown-wheel and the bent rake-post—whereby the rake is normally caused to travel the proper path without being positively or forcibly held down to its work while acting as a rake, and breakage is avoided, as will hereinafter fully appear.

The object of the next part of my invention is to hold the rake down to its work by the spring-pressure of its self-compensating connection with force sufficient to insure proper work, instead of depending upon gravity alone, and yet allow the rake to rise from the platform to avoid breakage; and under this head my improvements may be defined as consisting in the combination of a revolving rake-support—such as a crown-wheel—a bent or crooked rake-post projecting inward and upward above the crown-wheel, or extending in a general direction toward the cutting apparatus and platform side of the machine, a rake-arm hinged at its heel to the crown-wheel near its edge or remote from its center of revolution and playing vertically about its hinge, and an automatically-adjusting or self-compensating connection between the rake-arm and the bent rake-post, which connection is self-adjusting lengthwise as well as flexible or transversely yielding to accommodate variations in the distance between the points of its attachment to the rake-arm and rake-post and permit of variations in the altitude or vertical positions of the rake, the said compensating connection embracing in its construction a pitman, rod, or link swiveled at its inner end to and turning freely about the rake-post above the crown-wheel, an attachment on the rake-arm to which the outer end of the link is swiveled or doubly jointed, and a spring acting with a tendency to elongate the connection to its utmost extent, whereby, while at the proper time the rake is caused to descend, and when revolving about the crown-wheel axis alone as a center is normally held to its work, so as to prevent jumping or the partial failure to act on the cut grain when thick and wet—a defect incident to the operation of a rake held to its work by gravity merely—the rake is yet free to yield or move vertically by the shortening of the compensating connection when such movement is necessary to prevent the breakage of parts, which breakage would result from positively holding the rake to its work, the rake after sweeping the platform being caused to ascend and revolve in a differential path or about two centers—the crown-wheel axis and the bent rake-post—and move round to the starting-point to repeat the operation.

The object of the next part of my invention is to render the rake adjustable, so as to strike into the grain sooner or later or descend at the beginning of its action closer to or more in advance of the finger-beam; and under this head my improvements may be defined as consisting in the combination of a crown-wheel, a bent or crooked rake-post, a vertically-playing rake-arm hinged to the crown-wheel edge, a self-compensating connection between the rake-arm and the rake-post, and means for lengthening and shortening the link or pitman portion of said connection to vary the distance between the rake-post and a bracket on the rake-arm, which forms the outer portion of the said connection, whereby, while the time or point at which the rake descends may be varied, the compensative functions of the connection are not impaired.

The above outlined improvements and other and minor features of my invention will hereinafter specifically be designated by the claims.

In the accompanying drawings, which show so much only of a machine as is necessary for an illustration of the improvements herein claimed, Figure 1 is a plan or top view. Fig. 2 is an elevation with the crown-wheel in section, showing more particularly the rake-arm and its connections. Fig. 3 is a similar view, showing a reel-arm and its connections. Fig. 4 is a plan view of the crown-wheel, showing the rake-arm in two positions, and Fig. 5 is a plan view of tripping mechanism, or devices for throwing the rake into action, with the crown-wheel removed.

The drawings show only one rake and one reel-arm and its beater; but a full reel is of course to be used, and more than one rake may be employed, if desired.

On the inner end of the grain-platform or finger-beam A is mounted a bracket, B, which has a tubular socket, $b$, for the reception of a crooked or bent rake-post, C, which is secured therein by a set-screw, $b'$, so as to project inward and upward, and the post has rigidly secured to it a collar, $C'$, which has on it a sector-rack, $c$. Between this collar and the rake-post socket a crown-wheel, D, which may be driven in any well-known suitable way, revolves loosely upon the rake-post beneath its bent or inwardly-projecting part.

A rake-arm, E, provided with a suitable head, and each reel-arm with bat or beater, are hinged in ears or lugs G on the crown-wheel, remote from its center or near its edge, so as to rock vertically on their pivots and readily to rise and fall at their outer ends to the desired extent. Each reel-arm is connected with the upper overhanging end of the rake-post by a swiveling link, $f$, which turns freely about the post eccentrically to the crown-wheel.

A swinging bracket, $e$, pivoted on the rear side of the rake-arm, (the side opposite that which strikes against and pushes the grain,) is connected with the rake-post by a pitman or link, $e'$. This link or pitman is doubly jointed or swiveled to the overhanging rake-post near its end, and turns about it eccentrically to the crown-wheel; and by means of the screw-thread on the inner end of this link it may, in an obvious way, be lengthened or shortened by adjusting it in its screw-coupling or nut-hanger $e^2$, thus adapting the rake to strike into the grain sooner or later, as desired. A doubly-flexible joint or swiveling connection is also made between this pitman and the bracket $e$ at its rearmost part. The bracket plays on its pivot connecting it to the rake at or about at a right angle to the plane of movement of the rake about its heel-pivot or hinged connection with the crown-wheel. The bracket swings horizontally, or thereabout, when the rake is at work, and thus plays in and out, or toward and from the rake, instead of vertically, or above and below the plane of the rake. The horizontal swing and the protection of the bracket and its joints prevent the entanglement of the grain by the bracket and its connections, or greatly lessen liability of clogging. The bracket $e$ and link or pitman $e'$ constitute a flexible connection between the rake-arm or head and the upper part of the rake-post, which flexible link or pitman-connection allows of the distance between the rake-head and top of the rake-post being increased or diminished within certain limits, as may be desired. They (the bracket e and pitman or link e') also constitute the main features of a self-compensating or automatically-adjusting connection between the rake and the reel-post. The swing of the bracket lengthens or shortens this link-connection, and the flexing of the joints between the pitman, the bracket, and the rake-post allows of all necessary lateral movement. A spring and a stop to limit the play of the bracket in the direction that the spring moves it or exerts a tendency to swing it, completes the automatically-working or self-compensating connection, as will presently be explained.

A bracket-controlling rod, H, passes at its outer end through an eyebolt or swiveling-socket, h, on the swinging bracket of the compensating connection between the rake-post and rake. This rod plays endwise in the eye h, and the bracket is limited in its swing inward or controlled in its movement in the direction in which it moves in lengthening the self-compensating connection by a cross-pin or stop, x, on the rod inside the bracket, and between it and the crown-wheel. At its inner end the rod H is swiveled to a crank-plate or turning disk, I, on a stud or shaft, i, which revolves in suitable bearings in the crown-wheel. This shaft carries a pinion, K, which engages at suitable intervals—once for every revolution of the crown-wheel—with the sector-rack c on the collar C'. The crank-plate is made concave on one side or edge to fit the periphery of the collar C' when not engaged with the rack. The effect of this construction is to hold the shaft and prevent it from turning, except at proper times, without, however, interrupting its rotation with the crown-wheel. A spiral spring, J, extends from an adjustable lug, j, on the controlling-rod H to a hook on the bracket e, and as the bracket-controlling rod slides loosely in the eye h when the bracket swings, the spring, (which exerts a constant inward pull on the bracket,) draws the rake down on the platform and maintains it there, with the teeth in contact with the platform, throughout the sweep of the rake over the platform, under ordinary circumstances, while allowing the rake to yield when too great resistance to be safely overcome is encountered. The lug j consists of a sliding collar and a set-screw to hold it as adjusted to regulate the tension of the spring. Under some conditions, as where the rake-head is heavy enough to act properly by gravity, the spring J may, if so desired, be omitted, as it is readily removable. Its use, however, is highly desirable, as it adds to the efficiency of the machine and admits of the successful employment of a light rake arm and head for all work, the action of the spring being adjusted to suit the circumstances.

In operation it will be seen that the compensating connection—the bracket, the pitman linking it with the rake-post, the stop which is provided on the controlling-rod, and the spring carried by the rod—is self-adjusting in length to suit the variations requisite in its length to cause the rake to move in the proper path. In first descending to its work the rake is prevented from dropping too low by the contact of the bracket with the stop as the pull of the spring swings the bracket inward, and as the rake moves on the connection first shortens by the swing outward of the bracket against the pull of the spring, and then lengthens again, after the partial sweep of the platform, until at about the time the rake has completed its sweep to remove the gavel, when the connection is at its greatest length, and so continues until the rake is again about to act. The slight endwise movement of the spring-carrying and stop rod or controller H imparted to it by the revolution of the crank-plate I, as will be readily understood, facilitates the operation, for at the time the compensating connection has to shorten to adjust itself to the lessened distance between the rake-post top or overhanging end and the bracket hinge or point of attachment of the connection to the rake the controlling-rod H moves outward. As the swing of the bracket against the strain of the spring to an extent sufficient to shorten the connection is decreased to the extent of this thrust of the rod, the strain on the spring and power exerted is just that much less than would be required were the spring and the stop to control the movements of the bracket in opposite direction fixed instead of being mounted on the rod. The crank-plate, as it continues to revolve, gradually draws the rod H inward until the stop on the arm has been brought to the proper point to allow the compensating connection to lengthen to the necessary extent.

In order that the head of the rake may be employed as such, or be allowed to act simply as a reel bat or beater, I provide setting or tripping mechanism by which to throw the rake into operation. Normally the rake acts simply as a reel, or passes over the platform with the teeth above it and without sweeping off the grain. The tripping devices are as follows: A gravity-dog, L, is pivoted to the rake-arm, so that as the crown-wheel revolves and the rake-arm rises this stop will fall into a position to bring its nose or point between the rake-arm and crown-wheel, or a rib, l', on the crown-wheel, and thus prevent the rake-head from descending on the platform to act as a rake proper.

A horizontally-swinging tripping-latch, N, is pivoted on a plate, M, secured on the bracket B, beneath the crown-wheel. A spring, n, when allowed to act freely, serves to retain the latch in its normal or inoperative position under the crown-wheel, in which position the outer surface or edge of the latch-nose is about in the plane of or flush with the periphery of the crown-wheel. This spring-latch is controlled by a compound or jointed lever, O, pivoted at o upon the frame of the machine, and operated by a link or chain from the driver's seat in the usual way.

When it is desired to rake a gavel from the platform by the before-described operation of the rake the driver operates the lever O, which throws the spring tripping-latch N out at its point against the force of the spring, which acts on its heel with a tendency to keep the point in, and the latch-point is thus brought into the path ordinarily traveled by a lug or fixed downhanger, $l$, on the gravity-dog L. The contact of this lug with the latch forces the dog from between the rake-arm and crown-wheel, and thus allows the rake to descend and sweep the platform. The outward movement of the dog is limited by a pin, $l^2$, on the rake-arm. It will thus be seen that when the rake-head is acting as a rake the rake-arm rests on the crown-wheel, and when the head is serving simply as a reel-bat or passes above the platform clear of the grain upon it the rake-arm rests on the dog, which in turn rests on the crown-wheel.

As before indicated, I am well aware that harvesters having intermittingly-operating rakes, or combined rakes and reels, supported and controlled in their movements by crown-wheels or similar revolving carriers or supports, and bent posts are, broadly considered, old, being shown by the numerous patents of Barnes and others; and I do not therefore claim a rake jointed at its heel to a crown-wheel and connected with the bent post, so as to revolve in a differential path about two centers, nor the combination of such parts with a series of reel-arms traveling in an irregular path differing from that of the rake, and also about two centers—the bent post and crown-wheel axis. I am not aware, however, of any improvements prior to my invention in this type of rakes in which is employed the lengthening and shortening or flexible pitman or link connection between the overhanging or bent rake-post and the rake arm or head; nor that prior to my invention there had been employed a self-compensating or automatically-adjusting connection such, or essentially such, as constituted by the said flexible connection and its adjuncts, nor provision made for holding a rake down to its work with a yielding or spring pressure, as explained.

I claim as of my own invention—

1. The combination of the crown-wheel, the bent or overhanging rake-post, a combined rake and reel or revolving rising and falling arm provided with a rake-head having the capacity of acting either simply as a reel-bat or as a rake, a flexible lengthening and shortening connection between the rake-head and upper part of the rake-post, which connection admits of the distance between the rake-head and upper part of the post being increased when acting as a rake and decreased when the rake-head is changed to a reel-bat, and a dog having the capability of being interposed between the crown-wheel and the rake-arm to cause said head to act as a reel-bat, substantially as hereinbefore set forth.

2. The combination of the crown-wheel, the bent or overhanging rake-post, a combined rake and reel or revolving rising and falling rake-head having the capacity of acting either simply as a reel-bat or as a rake, a flexible lengthening and shortening connection between the rake-head and upper part of the rake-post, which connection admits of the distance between the rake-head and upper part of the rake-post being increased when acting as a rake and decreased when the rake-head is changed to a reel-bat, a dog for interposition between the crown-wheel and rake-arm, and tripping mechanism, substantially as and for the purpose hereinbefore set forth.

3. The combination of the crown-wheel, the bent or overhanging rake-post, a combined rake and reel or revolving rising and falling arm provided with a rake-head having the capacity of acting either simply as a reel-bat or as rake, the flexible lengthening and shortening connection (consisting of a jointed pitman or link and swinging bracket) between the rake-head and upper part of the rake-post, which connection admits of the distance between the rake-head and upper part of the post being increased when acting as a rake and decreased when the rake-head is changed to a reel-bat, and a dog having the capability of being interposed between the crown-wheel and the rake-arm to cause said head to act as a reel-bat, substantially as hereinbefore set forth.

4. The combination of the crown-wheel, the bent or overhanging rake-post, a combined rake and reel or revolving rising and falling rake-head having the capacity of acting either simply as a reel-bat or as a rake, the flexible lengthening and shortening connection (consisting of a jointed pitman or link and swinging bracket) between the rake-head and upper part of the rake-post, which connection admits of the distance between the rake-head and upper part of the rake-post being increased when acting as a rake and decreased when the rake-head is changed to a reel-bat, a dog for interposition between the crown-wheel and rake-arm, and tripping mechanism, substantially as and for the purpose hereinbefore set forth.

5. The combination of the crown-wheel, the bent or overhanging rake-post, the hinged rake-arm, a lengthening and shortening flexible or link connection between the rake-head and upper part of the rake-post, and a spring having the capacity of assisting in holding the the rake-head down to its work, and yet allowing it to yield and its teeth to rise above the platform, substantially as and for the purpose hereinbefore set forth.

6. The combination of the crown-wheel, the bent or overhanging rake-post, the hinged rake-arm, a lengthening and shortening connection between the rake-head and upper part of the rake-post, a spring having the capacity of assisting in holding the rake-head down to its work, and yet allowing it to yield and its teeth to rise above the platform, and means controllable by the driver to prevent the descent of the rake-head to the platform when it is desired to have said head act as a reel-bat simply, substantially as hereinbefore set forth.

7. The combination of a combined rake and reel or revolving rising and falling arm provided with a rake-head having the capacity of acting either simply as a reel-bat or as a rake, the bent or overhanging rake-post, the flexible lengthening and shortening connection (consisting of a jointed pitman or link) between the rake-head and the upper part of the rake-post, and a spring assisting to hold the rake-head down to its work when operating as a rake, and yet allowing of the action of said head as a reel-bat when desired, substantially as hereinbefore set forth.

8. The combination of a combined rake and reel or revolving rising and falling arm provided with a rake-head having the capacity of acting either simply as a reel-bat or as a rake, the crown-wheel, the bent or overhanging rake-post, the flexible lengthening and shortening connection (consisting of a jointed pitman or link) between the rake-head and the upper part of the rake-post, a spring assisting to hold the rake-head down to its work when operating as a rake, and yet allowing of the action of said head as a reel-bat when desired, and a dog having the capability of being interposed between the crown-wheel and the rake-arm, substantially as hereinbefore set forth.

9. The combination of a combined rake and reel or revolving rising and falling arm provided with a rake-head having the capacity of acting either simply as a reel-bat or as a rake, the crown-wheel, the bent or overhanging rake-post, the flexible lengthening and shortening connection (consisting of a jointed pitman or link) between the rake-head and the upper part of the rake-post, a spring assisting to hold the rake-head down to its work when operating as a rake, and yet allowing of the action of said head as a reel-bat when desired, a dog for interposition between the crown-wheel and rake-arm, and tripping mechanism, substantially as and for the purpose hereinbefore set forth.

10. The combination, substantially as hereinbefore set forth, of the bent or overhanging rake-post, the crown-wheel, a rising and falling rake-arm hinged to the crown-wheel and provided with a rake-head having the capacity of acting either simply as a reel-bat or as a rake, the flexible lengthening and shortening connection (consisting of a jointed pitman or link) between the rake-head and upper part of the rake-post, which connection admits of the distance between the rake-head and upper part of the rake-post being varied, and a dog having the capability of being interposed between the crown-wheel and rake-arm for converting the rake-head into a reel-bat, whereby when said head is acting as a reel-bat the arm in passing over the platform will be supported by the dog resting on the crown-wheel, and during a corresponding time in its revolution, when the head is acting as a rake, the arm will be supported on the crown-wheel.

11. The combination, substantially as hereinbefore set forth, of the crown-wheel, the inwardly-bent or overhanging rake-post, the rake-carrying arm hinged at its heel to the crown-wheel near its edge and playing vertically, and a compensating connection between the rake and the rake-post, said connection being both flexible or transversely yielding and self-adjusting in length, for the purpose described.

12. The combination of the crown-wheel, the inwardly-bent or overhanging rake-post, the rake arm hinged to the crown-wheel remote from its center and playing vertically, and a self-compensating connection between the rake-arm and the rake-post, having a constant spring-pressure exerted upon it, acting with a tendency to elongate it, and limited in its contractive adjustment, substantially as and for the purpose set forth.

13. The combination, substantially as hereinbefore set forth, of the crown-wheel, the inwardly-bent or overhanging rake-post, the rake-carrying arm hinged at its heel to the crown-wheel so as to play vertically, and a self-compensating connection between the rake-arm and rake-post, the link or pitman portion of which connection is adjustable to vary the distance between the points of attachment of the compensating connection with the rake-post and the rake-arm, for the purpose described.

14. The combination, substantially as hereinbefore set forth, of the crown-wheel, the inwardly-bent or overhanging rake-post, the rake-arm hinged at its heel to said crown-wheel near its edge or remote from its center, and the bracket and pitman of the self-compensating connection, said bracket being pivoted on the rake-arm and swinging in a path at or about at a right angle with the plane of movement of the rake about its heel-pivot, and said pitman being doubly jointed at one end to the bracket and flexibly connected at its opposite end with the rake-post, about which it turns eccentrically to the crown-wheel, for the purpose set forth.

15. The combination of the rake-arm, the swinging bracket, the rod provided with a stop and playing loosely endwise in said bracket, and the spring, substantially as set forth.

16. The combination of the rake-arm, the pivoted swinging bracket thereon, the pitman turning about the rake-post, and the rod which plays loosely endwise in said bracket, substantially as set forth.

17. The combination of the crown-wheel, the rake-arm, the swinging bracket, the rod which plays loosely endwise in the bracket, the pivoted dog, and the spring-latch, substantially as set forth.

18. The combination of the rake-carrying arm carried by the crown-wheel and having vertical play about its hinged connection therewith, the inwardly-bent or overhanging rake-post, the swinging bracket and pitman adjustably connecting the rake-arm and rake-post, the rod sliding or moving endwise in the rake-arm bracket and serving to limit its inward play, the spring connecting said bracket and rod, and the crank-plate turning at intervals to positively move the sliding rod, for the purpose described.

In testimony whereof I have hereunto subscribed my name.

J. HERVA JONES.

Witnesses:
JNO. W. HEPBURN,
RALPH EMERSON, Jr.